United States Patent Office 3,761,238
Patented Sept. 25, 1973

3,761,238
TOXICANT COMPOSITIONS FOR AQUATIC USE
Louis A. Errede, Hatfield, England, assignor to Minnesota Mining and Manufacturing Company, St. Paul, Minn.
No Drawing. Continuation-in-part of application Ser. No. 714,755, Mar. 21, 1968. This application Apr. 6, 1970, Ser. No. 26,102
Int. Cl. A01n 17/08
U.S. Cl. 71—67         15 Claims

ABSTRACT OF THE DISCLOSURE

Compositions comprising an inert particulate carrier, the surface of the particles having inherent or extrinsic ion-exchange characteristics, and a normally water-soluble toxicant reversibly adsorbed in ionic form upon said surfaces. The compositions are greatly improved aquatic pesticides having the characteristic of regulated release of toxicant mediated at least in part by local environmental conditions including the presence of the undesirable species which is to be controlled. Also included are methods for using the compositions.

---

This is a continuation-in-part of patent application Ser. No. 714,755 filed Mar. 21, 1968, now abandoned.

This invention relates to aquatic pesticides and more particularly to compositions for controlled release of biocidal materials when introduced into water.

Aquatic pesticides are commonly added to an aquatic environment either in a soluble or emulsified form or as dense granules that sink directly to the bottom where they disintegrate in various ways to release copious amounts of toxicant to the water. In either case, the entire aquatic environment becomes contaminated with toxicant to a concentration level that is equal to or greater than the lowest lethal concentration (LLC) required to kill the undesired species within a few days. Usually a large excess must be added to maintain this level locally because of natural diffusion and water currents that exist in lakes and ponds. It is highly advantageous to contaminate only the surface space in the immediate vicinity of the undesired aquatic species, leaving the rest of the aquatic environment essentially uncontaminated for use by preferred animal species. It is also advantageous to localize application to given target areas without serious contamination by drift and diffusion to adjacent areas.

Methods are known for treating pesticides, such an insecticides or herbicides, to bring about slow release of the active material. Such slow release compositions have been produced by encapsulation in slowly soluble materials, dilution with an inert material as by adsorption on sand or clay, mixing with a water-insoluble resin, etc. Such compositions function chiefly by control of diffusion in a mechanical way. The density of the carrier in these formulations is such that the particles sink rapidly to the bottom without adhering to the plant foliage which is distributed throughout the bulk of the water.

It has been found that the efficacy of water-soluble pesticides with respect to the treatment of aqueous environments can be improved significantly if the pesticide is reversibly preadsorbed in its ionic form by ion-exchange processes on an ion-exchange material which is itself particulate or has been coated or deposited onto an inert particulate material having a density slightly greater or less than water.

Specifically, the present invention includes a method for the control of undesirable aquatic organisms and particulate compositions utilized in the practice of the method. The method comprises applying to a specific area of a water environment a particulate composition containing at elast one biocidal ionic toxicant substance bonded by reversible ion-exchange to the surface of a water-insoluble, particulate, inert carrier which varies in specific gravity from that of the aqueous medium (which may be fresh water or contain dissolved materials, as in the case of sea water) by a controlled amount so that the particles concentrate in local areas in which the undesirable organisms are formed (e.g. at the top or bottom of the body of water, on the surfaces of floating or submerged plants, etc.) and there release the biocide by desorptive ion-exchange, the amount of the particulate composition applied being sufficient to provide localized lethal concentrations of the biocide without rendering the bulk of the water environment lethal.

The particulate compositions of the invention preferably contain from about 0.1 to 85 percent of at least one normally water-soluble biocidal ionic toxicant substance (the percentages herein being by weight) bonded by reversible ion-exchange to a water-insoluble ion-exchanger supported upon a water-insoluble, particulate, inert carrier, the composition varying in specific gravity from that of water by a controlled amount to operate according to the method of the invention. Thus, particles to be utilized for control of undesirable submerged plants have specific gravity slightly greater than the aqueous medium so that they settle through it without significant loss of the adsorbed toxicant and come to rest on a submerged surface, such as a plant or the bottom. The toxicant is then released slowly by ionic exchange processes at a rate approaching that at which the pest species can absorb the toxicant for a period of time long enough to cause death or other control. The toxicant charge carried by the particles is limited, so that the supply is exhausted soon after the aquatic species is controlled, e.g. becomes moribund. Particles of density slightly less than water are used similarly to control surface plants or animals.

The terms pesticide and biocide herein comprise herbicides (including algacides) and zoocides, these terms including the broader concepts of plant and animal control, respectively. Thus, the desired control in a particular instance might be realized by killing only a certain percentage of the plants or animals, or only certain species in a given area. Also it might involve modification or regulation of the growth thereof, or perhaps simply the repulsion of motile species.

As noted previously, the particulate compositions of the invention can contain from about 0.1 to 85 percent of the toxicant. Lower toxicant levels are not economically practical and levels above 85 percent ordinarily lead to undesirably rapid release of toxicant (indicating that at least a part of it is not ion-exchanged onto the particulate base) and to difficulties in application. Preferably the compositions contain not more than 50 percent of toxicant, the more preferred range being from 1 to 30 percent on a weight basis.

The particles normally contain the biocidal ionic toxicant bonded by reversible ion-exchange to a water-insoluble ion-exchanger which is in turn supported upon a water-insoluble, particulate, inert carrier. When needed, from the standpoint of capacity, and where applicable, from the standpoint of sedimentation rate, it is possible to use the anion exchange material per se as the carrier without the inert substrate. Usually there is no particular advantage in this, however, since in most cases the demand is for particles of low capacity with respect to toxicant. From the standpoint of economics, it is preferable to have the weight fraction of ion-exchange coating as low as possible commensurate with the required amount of toxicant.

The particles of the invention thus preferably contain three major ingredients: (1) the toxicant, preferably in the range of 0.1 to 50 percent (on the basic of the exchanged ion), (2) the reversible ion-exchanger, preferably in the range of 1–49 percent (on the basis of the ion-exchange species itself, e.g. as shown hereinbelow the hydrous oxide, salt or polymeric quaternary amine) and (3) the particulate carrier. Frequently also the particles will contain a by-product of their preparation, such as an alkali metal salt of a strong acid. These are essentially inert biologically and can be considered to be a part of the carrier. Finally, minor amounts of other additives such as wetting agents, etc., can be present.

A more preferred class of the particles of the invention, generally including the commercial embodiments, contain 1–30 percent of toxicant, 1–30 percent of the reverible ion-exchanger and the remainder including the particulate carrier and other material as mentioned above.

The particles of the invention are applied to the water surface, conveniently at a level of 35 to 350 pounds per surface acre, although higher or lower levels might be used in certain cases, e.g. from 10 to 1000 pounds per acre. The treatment level used will depend upon such factors as percentage of toxicant in the particles, the organisms to be killed or controlled, the density and stage of growth thereof, weather conditions, water temperature, bottom profile and currents, etc.

Upon application, particles for the treatment of submerged plants or animals move downward through the aquatic medium within a reasonable time interval, without significant loss of toxicant, to the target area where they cling to the surfaces to be treated. The geometry and size of the particles are selected to be such that the force of adhesion is greater than the forces due to gravity or to ambient water currents. Often particles with flat, plate-like shapes will remain on surfaces above the bottom (such as submerged leaves) to a greater extent than more blocky particles.

Fish, humans and other desirable organisms inhabiting or using the volume space through which the toxicant-bearing particles traverse are not affected adversely, since the release rate is so slow that the lethal level cannot be attained during the time required for the particles to pass through the aquatic space.

This ability to kill undesirable species, e.g. plants without wasteful and dangerous overtreatment is also a definite economic advantage. Moreover, the distribution pattern of the particles in their downward progress is such that only the plants in the area treated are affected by the slow release of toxicant. Drift is minimized and plants growing in adjacent areas continue to flourish.

When the particles come to rest, however, the time factor is eliminated. However, there is often a special chemical environment adjacent to submerged surfaces upon which the particles settle which increases the rate of desorptive ion-exchange. Often there will be a local build-up of other ionic species to exchange with and thereby release the pesticidal ions. Aquatic plants expire $CO_2$ which combined with water to give $HCO_3^-$ ion which in turn can accelerate liberation of toxicant by anion exchange processes. Biological oxidation and degration in the mud bottom accelerate the rate of desorption markedly there.

Thus, during this time interval in which the toxic agent acts when compositions of the invention are used, only the space between the particles and the surface upon which they come to rest (such as the bottom or top of the body of water or a plant surface), and perhaps the immediate surroundings contains a concentration above the lowest lethal concentration (LLC) with respect to toxicant. In this space, however, the concentration of toxicant rapidly increases to the lethal level and is apparently maintained there, owing to limited lateral diffusion.

In the control of undesirable animal organisms such as rough fish, sea lamprey, and mosquito larvae, particles of ion-exchanger containing suitable toxicants and heavier than water traverse the aqueous medium to which they have been added without significant loss of toxicant until they settle uniformly on quiet mud bottoms where the rough fish or sea lamprey are known to dwell during some critical period of their life cycle. The lampricide or piscicide accumulates rapidly at the surface of the mud bottom to kill the undesired organism without contaminating the water system significantly from the point of introduction of the composition to the final target area. In some cases this may represent several miles of a fresh water creek, in others it may only represent the space from the surface of a lake to near the bottom. For the latter cases, it is best to pelletize the particles before broadcasting over the surface. When hydrobiotite (a form of mica with properties similar to vermiculite) or vermiculite carriers are used, the pellets expand markedly as soon as they hit the water, and they disintegrate in their downward trajectory forming particles that distribute themselves in an ever widening pattern along the general path of the trajectory.

For control of surface dwelling species such as mosquito larvae or duckweed, carrier particles are used which are lighter than water, such as coated expanded vermiculite or perlite.

A variety of particulate materials are suitable for use as carriers or substrates in the present invention, and the choice can be made in accordance with the intended use. Substantially any water-insoluble material can be used so long as it can be coated with the ion-exchange agent and holds the same against removal by water. Included are various natural minerals and soils, sand, clays, talc, kaolin, bentonite, titanium dioxide, micas, vermiculite, hydrobiotite, Aerosil (extremely light $SiO_2$), glass microspheres and perlite. Hydrobiotite, a preferred material, is a micaceous material made by replacing potassium in biotite with water, e.g. as described in The American Mineralogist, v. 26, No. 8, pp. 478–484, 1941. For slow release at the bottom of a body of water, mineral with a high bulk density, such as sand, clays, mica or pelletized particulate hydrobiotite or vermiculite would be chosen for rapid sedimentation. For surface treatment, lighter materials such as expanded vermiculite, perlite and glass spherical microballoons would be preferred. For treatment of aquatic vegetation or animals distributed randomly throughout the aquatic space, material with intermediate density, such as finely ground expanded hydrobiotite or vermiculite, would be more suitable.

These carrier materials are generally essentially inert as pesticides, although they are frequently active in other ways. Thus, natural minerals (including siliceous materials such as clays, micas, vermiculites and most soils) have strongly anionic surfaces and thus tend to permanently bond cations although they will not bond to anions to any practical degree. This suggests their application for controlled release of cationic herbicides such as 1,1'-dimethyl-4,4'-bipyridinium dibromide (hereinafter Compound IX). Unfortunately, these materials have too great an affinity for cations, and desorption is virtually impossible before normal degradation occurs. For these materials to be used as such as carriers, it is at least necessary to cause them to absorb a several-fold greater amount of toxicant than that required to saturate the surface capacity for cation. This is economically wasteful since much of the toxicant charge can never be released to control aquatic species and that which is removed was in all probability not ionically bonded in the first place. In fact, suspensions of these siliceous materials in water render normal treatment with soluble cationic toxicant ineffectual because of the rapid rate at which these suspensoids remove the cationic toxicants from solution.

It has been found, however, that the affinity of these siliceous materials for cations is decreased considerably by prior surface treatment thereof with reversible ion-exchangers, of the types discussed hereinafter, such as aluminum hydroxide. Cationic toxicants adsorbed on surfaces of clays, micas, vermiculites, etc., previously coated with such reversible ion-exchangers are retained sufficiently well to prevent significant desorption during sedimentation, but the desorption rate is fast enough to make these materials useful compositions of the invention.

Another source of deactivation in aquatic media of cationic toxicants such as Compound VIII is strong sunlight, which dictates that application of these compounds as such be made during overcast days or at night. Apparently such compounds undergo photochemical transformation in aquatic media that renders the product ineffectual as an aquatic toxicant. Deleterious photochemical degradation is markedly reduced when such compounds are adsorbed on $Al(OH)_3$ modified particles in the compositions of the invention.

Ion exchange materials which are useful in the process of this invention include inorganic materials, e.g. those described in U.S. Pat. 3,002,932. Hydrous oxides of multivalent metals, including e.g. aluminum hydroxide, magnesium hydroxide, zinc hydroxide, ferric hydroxide, copper hydroxide, the basic salts of calcium and barium, as well as insoluble polymeric organic quaternary amines, such as crosslinked polymeric quaternized polyvinyl pyridines and polyvinyl aminostyrenes can also be used on the particulate carrier to produce a surface layer or coating for adsorption of the toxic agent.

The inorganic materials are preferable, since they are cheaper and they minimize the amount of foreign organic additives that consume dissolved oxygen by biodegradation and may possibly produce soluble degradation products that are objectionable or even harmful to human and animal life. Furthermore, the hydrous oxides are amphoteric and provide among them suitable reversible ion-exchangers for use with both anionic and cationic toxicants over the entire pH range encountered in aquatic environments, which is normally between 5 and 9. Aluminum hydroxide is especially suitable because of its amphoteric character and its relatively low cost.

The hydrous oxides (or metal hydroxides) used as ion-exchange coatings are conveniently coated upon the surfaces of the selected inert particulate material by precipitation of the hydroxide in an aqueous slurry of the particles. This can be done in various ways as indicated below by the following representative equations:

(1) Neutralization of soluble alkaline form

Ex.: $NaAlO_2+HZ+H_2O \rightarrow Al(OH)_3+NaZ$ where HZ is any inorganic acid, such as HCl, $H_2SO_4$, $HNO_3$, or any organic acid with carboxylic, sulfonic or phosphoric acid groups.

(2) Neutralization of soluble acid form

Ex.:

$$AlX_3+3NaA+3H_2O \rightarrow Al(OH)_3+3NaX+3HA$$

where X is an anion of a strong acid, such as $Cl^-$, $Br^-$, $SO_4^=$, $NO_3^-$, or a mixture of such anion and OH, and A is either OH or anion of a weak acid, such as acetic, benzoic, and the like.

The thickness of the hydroxide coating is a function of the ratio of the amount of metal hydroxide produced to the available surface of inert particulate substrate charged to the mixture. The metallic hydroxide coatings may retain some of the anions used to effect the neutralization, without significant loss of exchange capabilities. The composition of the coating is thus, e.g. really $Al(OH)_{3-n}X_n$ where X represents various anions exchanged from solution. The magnitude of this absorption ($n$) is proportional to the final concentration as determined by the equilibrium constants at the pH in question.

If desired, it is possible to neutralize NaAlO as in Method 2 above with the acid form of the toxicant in question or an inorganic acid can be used for neutralization followed by anion exchange with the desired toxicant, either in the same solution or after the solid has been collected by filtration and re-slurried in the second solution.

The ion-exchange reaction which is used to place the toxic agent on the hydroxide or other ion-exchanger is the replacement of OH by inorganic or organic anions. This is a general reaction as indicated below:

$$Al(OH)_{3-n}X_n+mZ^- \rightarrow Al(OH)_{3-(m+n)}Z_mX_n+mOH^-$$

Replacement of adsorbed anions other than OH also occurs concomitantly with the above reaction.

$$Al(OH)_{3-n}X_n + mZ^- \longrightarrow Al(OH)_{3-n}X_{(n-m)}Z_m + mX^-$$

The relative rates of these alternative reactions are determined by the relative affinities of the ions in question for the metallic hydroxide substrate.

Visible evidence of the general nature of this reaction is given by color adsorption using anions such as $MnO_4^-$, $CrO_4^=$ or organic dyes with attached —OH, —$CO_2H$, —$SO_3H$ or $PO_3H$ groups as exemplified by eosin, fluorescein, methyl orange and the like.

These dye anions are desorbed slowly be repeated extraction with distilled water. The rate of desorption is increased by the presence of salts in accordance with known principles of ion-exchange.

The use of dye-bearing particles is useful as a visual aid in the demarcation of treated areas. Thus, little dye was lost when the particles were allowed to settle in a 20 gallon tank filled with lake water. Within a day, however, a colored layer ¼ to ½ inch thick developed over the bottom of the tank where the particles came to rest. When the tank was furnished with growing plants and the sedimentation experiment repeated, the colored layer appeared in the vicinity of the particles resting on the plant (as well as on the bottom), and the concentration of dye decreased outward laterally and downward from the leaves into the bulk of the water. Similarly, particles added to run-off water in a field imparted no detectable color to the water stream except to the area where the particles ultimately accumulated in quiet pools.

Anions which are particularly useful for control of aquatic vegetation are 7-oxabicyclo[2.2.1]heptane-2,3-dicarboxylate (I), 2,4-dichlorophenoxyacetate (II), 2-(2,4,5-trichlorophenoxy)propionate (III), trichloroacetate (IV), 2,2-dichloropropionate (V), 4-amino-3,5,6-trichloropyridine-2-carboxylate (VI), arsenite (VII), and the like. They may be represented by the formulae:

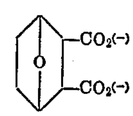

I

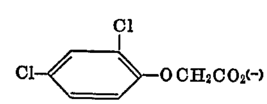

II

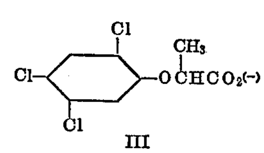

III $CCl_3CO_2^{(-)}$

IV $CH_3CCl_2CO_2^{(-)}$

V

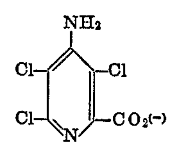

VI $AsO_2^{(-)}$

VII

The sodium or potassium salts of anions I, II, III, IV, V and VI are also known commercially by common (and trademark) names, e.g. endothall (Aquathol), 2,4–D, Silvex (Aquavex), TCA, dalapon (Radapon) and picloram (Tordon), respectively.

Cations which are particularly useful for control of aquatic vegetation include: 1,1'-ethylene-2,2'-bipyridinium (VIII), 1,1'-dimethyl-4,4'-bipyridinium (IX), e.g.

VIII (structure: 2,2'-bipyridinium, +/+)

IX (structure: CH₃-N⁺...N⁺-CH₃, 4,4'-bipyridinium dimethyl)

and cupric ion.

The bromide and chloride salts of cations VIII and IX are known commercially by the trademark names Diquat and Paraquat, respectively.

Some ionic compounds used for control of aquatic animals (zoocides) are: 2-trifluoromethyl-4-nitrophenol (X), 3'-chloro-3-nitrosalicylanilide (XI), 2',5-dichloro-4'-nitrosalicylanilide (XII), N,N-dimethylcocoamine (XIII), antimycin A (XIV) and pentachlorophenol (XV). The active forms of these substituted phenols are the anions $X\phi O^{(-)}$, wherein $X\phi$ is the substituted phenolic ring. Their formulae are, respectively:

X (4-nitro-2-trifluoromethylphenol structure)

XI (3'-chloro-3-nitrosalicylanilide structure)

XIII (2',5-dichloro-4'-nitrosalicylanilide structure)

$(CH_3)_2N(CH_2)_{11-21}CH_3$

XIII

XIV (antimycin A structure)

XV (pentachlorophenol structure)

When one (or more) of these toxicants (T) are adsorbed on surface active particulate materials the release rate is given by equation $$\frac{d\phi_T}{dt} = -\left(\sum_i^n k_i I_i\right)\phi_T$$

where $\phi_T$ is the fraction of surface covered by toxicant, $I_i$ is the concentration of solvated $i^{th}$ anion, and $k_i$ is its corresponding rate constant which is proportional to the relative affinity for the particulate surface. The rate of desorption is slower in distilled water than in lake water which has dissolved anions, and is proportional to the localized ionic strength. At leaf surfaces, where $CO_2$ is given off at night, and in mud bottoms with decomposed vegetation, the rate of desorption is faster than when the particle is suspended in bulk phase.

Each compound is added to control a finite set of living organisms which have specific sensitivity to the compound in question. The choice of toxicant to be adsorbed on the ion-exchange surface is determined by the species to be eradicated. In areas inhabited by several undesirable species sensitive to different toxicants it will be necessary to use two or more adsorbed ionic toxicants. In this respect, combinations can include anionic and cationic materials. Cations such as $Cu^{++}$ can also be incorporated in the reversible ion-exchanger (e.g. $Al(OH)_3$) coating by ion-exchange from concentrated copper salt solutions or by co-precipitation with $Al(OH)_3$ as $Cu(OH)_2$. Slow release of the $Cu^{++}$ occurs, for example at the plant surface, to maintain localized lethal concentration as described above.

Where necessary, neutral toxicants such as 2,6-dichlorophenyl cyanide (Casoron) or the esters of 2,4-dichlorophenoxyacetic acid can be included by absorbing the neutral compound in the porous structure of the carrier. Thus it may be possible to have three or more types of toxicants on the same particle, or have a blend of three or more types on separate particles. The ability to cause death by contaminating only the environment in immediate contact with the plant or animal exhibited by the compositions of the invention makes multiple toxicant treatment practically feasible from the standpoint of cost, capacity of toxicant charge and synergistic activity.

The sedimentation rate and the ability to cling to surfaces of aquatic vegetation can be modified beneficially by the use of additives such as polyvinyl alcohol or hydroxyethyl cellulose, (e.g. that available under the trade name Vistik). If it is desired, it is possible to coat these particles with the organic polymers to slow the rate of desorption even further. Wetting agents and other additives known to the art may also be added if desired.

The improved efficacy of localized treatment for eradication of aquatic weeds as brought about by use of the compositions of the invention has been demonstrated in laboratory tests and in numerous field evaluations. Various aquatic weeds growing in test jars containing a finite amount of water and a standard amount of various toxicants were used in the laboratory evaluations. The amount of toxicant selected was such that the concentration given by the ratio of toxicant to water volume was less than the established lowest lethal concentration required to cause death of one tenth of the plants after three weeks' exposure in the treated solution.

The test runs in which the plants were coated with toxicant compositions of the invention manifested total plant kill, whereas control experiments, in which the same amount of toxicant was added in its solvated form, failed to show any significant plant damage. Similarly, no plant damage was noted when the compositions of the invention, containing the same amount of toxicant, were added to the test system in such a way that no particles came in contact with any plant surface. These experiments were carried out using toxicant materials I through VII, to show the general applicability of the ion-exchange mechanism for control of aquatic plants by localized plant surface treatment. In fact, the bulk concentration using the particulate particles was so low that small fish, such as guppies and plants growing in the same water but containing no particles in contact with the foliage showed no apparent ill effects during the test period. Using bulk concentrations toxic to the plants would also have killed the fish.

While the disclosure herein has been directed to compositions containing toxicants, it will be apparent that the substances which are beneficial to aquatic life, e.g. fertilizers, can also be employed in the compositions of the invention.

The following non-limiting examples, in which all parts are by weight unless otherwise specified, will more specifically illustrate the invention.

EXAMPLE 1

Hydrated aluminum chloride, $AlCl_3 \cdot 6H_2O$, in amount of 313 g. (1.3 moles), was dissolved in one liter of water and the solution was adjusted to pH 5.5 with solid sodium hydroxide. The precipitated product was collected by filtration, dried, and then ground to a fine white powder. The material was extracted repeatedly with 500 cc. portions of distilled water, and the amount of Cl⁻ removed by each extraction was determined by volumetric titration. Extraction was continued until less than 0.1 g./liter of Cl⁻ was present in the filtrate. The elementary analysis values of the residue after 12 extractions were 64.4 percent $Al_2O_3$; 9.34 percent Cl; 0.01 percent Na; 0.01 percent Si, corresponding to the empirical formula $Al(Na_{0.0004})(SiO_2)_{0.0003}(Al_2O_3)_{0.03}(OH)_{2.78}Cl_{0.22}$ or, ignoring small amounts of impurities, $Al(OH)_{2.78}Cl_{0.22}$.

This material was extracted further with four ½ liter aliquots of 5 percent aqueous sodium nitrate solution, and a large increase in the amount of Cl⁻ (16 g./liter) released by ion-exchange was noted commensurate with the increase in ionic strength. After two additional extractions with one liter of distilled water, the elementary analysis values of the product (13.5 percent $NO_3$; 0.45 percent Na; 0.66 percent Cl; 57.0 percent $Al_2O_3$) corresponded to the empirical formula $$Al(ONa)_{0.02}(OH)_{2.76}(NO_3)_{0.20}Cl_{0.02}$$

Samples of the nitrate-exchanged aluminum hydroxide thus prepared were used to show that the anions $OH^-$, $NO_3^-$ and $Cl^-$ could be replaced by a variety of anions, such as $MnO_4^-$, $CrO_4^=$, $SO_4^=$, picrate, fluorescein, eosin, methyl orange, Light Fast Yellow and Chlorantine Fast Turquoise VLL.

The rate of release of these adsorbed ions was relatively slow in distilled water and markedly increased in dilute saline solutions. This was vividly illustrated by anion replacement of colored anions.

The relative affinity of inorganic anions for $$Al(OH)_{3-n}X_n,$$

as indicated by the relative rate for replacing adsorbed eosin by 0.1 molar aqueous salt solution, was found to be in the order $$HPO_4^= \cong SO_4^= \cong HCO_3^- \cong F^- \gg Cl^- > Br^- > NO_3^-$$

Similarly, the relative affinity of organic acids is in the order dicarboxylic acid>monocarboxylic acid; disulfonic acids>monosulfonic acids; strongly acid phenols>weakly acid phenols.

Samples of this material were exchanged with toxicant anions I through VII from standard aqueous solutions of the toxicant salt. The amount of adsorbed ion was determined by elemental analysis.

A weight of each toxicant composition thus produced, containing about 0.00025 g. of adsorbed toxicant, was dispersed into test jars containing 4.5 liters of water in which were growing representative weeds selected from the group of weeds known to be sensitive to the particular toxicant. The particles of the toxicant compositions came to rest on the leaves of the plants. An equivalent weight of each toxicant used was added in its solvated salt form to other weed-containing jars used for controls.

In all cases the plants having toxicant-coated particulate material in contact with foliage were killed within a week, whereas the plants in the control jars continued to thrive indefinitely.

As an added control, the particulate material was added to another test system through a glass tube that extended to the bottom, so that all of the particles were deposited at the bottom of the flask and none made contact with the growing plants. These plants continued to thrive like the regular control despite the presence of the toxicant-coated particles. This result shows that normal desorption from the particles was not sufficient to raise the concentration level of the toxicant in the bulk aqueous phase, even in a closed system, up to the lowest lethal concentration required to kill the plants.

A 20 gram sample of nitrate-exchanged aluminum hydroxide as prepared above was digested in concentrated aqueous $CuSO_4$. The sample was then washed repeatedly with distilled water. The rate of elimination of $Cu^{++}$ was about 1½ times faster than the rate of elimination of $SO_4^=$, and after 10 extractions with 250 cc. portions of distilled water, the material still contained 1.9 percent $Cu^{++}$ and 3.9 percent $SO_4^=$. One-fourth gram samples of washed or unwashed cupric ion containing aluminum hydroxide were added to 4.5 liter test jars in which were growing filamentous algae. The algae were killed in five days. In contrast, an equivalent weight of copper sulfate added to control jars failed to destroy the algae therein.

Similarly, Compound VIII was adsorbed on a sample of nitrate-exchanged aluminum hydroxide and was observed to be desorbable at an appreciable rate in distilled water as indicated by spectrographic analysis of repeated extracts. The efficacy as a herbicide for aquatic plants of Compound VIII adsorbed on the aluminum hydroxide was compared to that manifested by the compound in its soluble form, as described above. The plants treated with toxicant-coated aluminum hydroxide particles died in five days, whereas those plants in contact with water containing an equivalent weight of toxicant dissolved in solution continued to live indefinitely.

EXAMPLE 2

Sodium aluminate (100 g.) was dissolved in 3 liters of water. The clear solution (pH 12.5) was neutralized slowly with 20 percent aqueous nitric acid. The amount of precipitate increased linearly with each incremental addition of acid. The pH decreased slowly to about pH 10, at which point neutralization was 85–90 percent complete. Thereafter, the pH changed relatively rapidly as acid was added, and the mixture was brought to pH 5.5. The precipitate which formed was separated by filtration and dried overnight at 120° C. The product was ground to a fine powder and then extracted successively with three 2 liter portions of distilled water. The elemental analysis values (66.3 percent $Al_2O_3$; 10.3 percent $NO_3$; 0.04 percent Na) indicated that the material was essentially $Al(OH)_{2.8}(NO_3)_{0.2}$, together with $Na^+$ and $Al_2O_3$.

This material, which can be described as nitrate-containing aluminum hydroxide, adsorbed anion readily as indicated by the ease with which it was stained by anionic dyes but not neutral dyes. Its ion-exchange properties were substantially the same as those of the material produced in Example 1.

Other mineral acids such as hydrochloric, sulfuric, carbonic and phosphoric were used in place of nitric acid to precipitate the aluminum hydroxide. The amount of anion "X" incorporated in the product $$Al(OH)_{3-n}X_n$$

was a function of the relative affinity and concentration of the anion of the acid at the time of separation.

Similarly, organic acids were used in place of mineral acids with comparable results, e.g. stearic acid, benzoic acid, cinnamic acid, succinic acid, the acid forms of Compounds I through V, picric acid and phenol were used to precipitate the aluminum hydroxide by simple neutralization. So long as the final pH value was above that at which the acid form becomes insoluble, the amount of anion incorporated in the product was about the same as that found using mineral acids. The composition of the products produced is represented by the general empirical formula $$Al(OH)_{3-n}X_n$$

where X is the anion used for neutralization and *n* ranges from about 0.1 to 2 or higher.

The anions X and OH can be replaced in turn with other organic anions (T) such as those of Compounds I through VII as described previously to give a product representable by $Al(OH)_{3-(n+m)}X_mT_n$.

The toxicant-coated particles produced, e.g. either (1) by direct neutralization of sodium aluminate with the toxicant in acid form or (2) by subsequent anion exchange of toxicant for X or OH in $Al(OH_{3-n}X_n)$, were equally effective as aquatic herbicides. The efficacy of toxicant in amounts far smaller than that needed to kill plants when toxicant is used in soluble form, was comparable to that reported in Example 1 using aquatic weeds growing in 4½ liter test jars.

EXAMPLE 3

Ten parts of sodium aluminate were dissolved in 500 parts of water. Forty parts of powdered hydrobiotite (approximately >200 mesh size) were slurried in the solution for 20 minutes. The mixture was neutralized (pH 7) by addition of acetic acid and evaporated to dryness at 70° C. The residue was washed with water and redried. Analysis showed the organic ion content to be 14.8%, and the ratio of Al to $RCO_2$ in the coating to be 2.5:1.

The ion-exchange characteristics of the adsorbed anion were comparable to those manifested in the absence of inert carrier. The material was found to be stained uniformly with eosin, when eosin-exchanged material was examined with a 60 power microscope, indicating that the coating was firmly bound to the carrier. The eosin dye, in turn was replaced by other anions by extraction with dilute salt solution of the anions in question, as described previously. Likewise, the coated hydrobiotite particles adsorbed toxicant materials by ion-exchange.

EXAMPLE 4

A solution of ten parts of sodium aluminate in 1000 parts of water was mixed with 40 parts of finely ground vermiculite and then brought to pH 10 with concentrated sulfuric acid. The solids were separated from the mixture by filtration. The filter cake was washed with water and then reslurried in 500 parts of a 0.1 molar solution of Compound I, again separated by filtration, washed several times with water and dried. Each gram of the product contained 43 milligrams of Compound I. One tenth gram of the product was dispersed in a 4.5 liter tank containing several flourishing coontail plants. The plants in this tank were dead within a week whereas the plants in a control tank in which an equal amount of Compound I was added in its soluble form continued to flourish. Similarly, plants treated with an amount of aluminum hydroxide-coated vermiculite, without the endothall, ten times as large as that used in the endothall-treated tank, continued to flourish.

EXAMPLE 5

A solution of 10 parts of sodium aluminate in 3000 parts of water was mixed with 100 parts of finely ground muscovite (>200 mesh) and then adjusted to pH 6 with concentrated hydrochloric acid. The mixture was separated by filtration. The filter cake was dried at 100° C., repowdered, and washed with water. Samples of the wet material were used to adsorb various anions from their respective aqueous solutions. Anions I through VII adsorbed on 5 g. portions in amounts of 30 mg. per gram.

The composites were evaluated in plant tests as described in Examples 1–4. Again the toxicant anion proved to be more effective as an aquatic herbicide in its adsorbed form than when added directly in its solvated form. In other tests, toxicant-coated particles, prepared as described above, were mixed with dye coated particles by compression molding. These pellets were added to water tanks five feet deep. The pellets disintegrated as they descended downward and the particulate material distributed itself uniformly across the bottom. Little adsorbed material was lost during the descent of the muscovite particles as indicated by little or no color formation in the bulk aqueous phase. A color layer about ½ inch thick developed along the bottom overnight, which gave visual evidence that localized surface contamination was occurring at the bottom.

EXAMPLE 6

A sample of 40 parts of finely ground $$Al(OH)_{3-(n+m)}T_nT'_m\text{-coated bentonite}$$

(>325 mesh) where T and T' are aquatic herbicide Compounds I and III, $n$ and $m$ being respectively 0.2 and 0.1, was dispersed in 300 parts of a 0.5 percent aqueous solution of polyvinyl alcohol. The resulting slurry was spray-dried to give a powder that was easily dispersed in water. The polyvinyl alcohol coating swelled in water and served to improve the contact adhesion of the particle to aquatic plant foliage. Visible inspection showed a larger proportion of particles clinging to the plant than in the case of uncoated particles. The efficacy as an aquatic herbicide was comparable to the usual $Al(OH)_{3-n}T_n$-coated particles and markedly better than that of toxicant added in its solvated form.

EXAMPLE 7

An enclosed system containing 40 g. of pearlite was evacuated to 2 mm. Hg pressure. A solution of 10 g. of sodium aluminate in 500 cc. of water was drawn into the system and the mixture agitated until all of the evacuated void spaces of the pearlite were filled with the aqueous solution. The system was equilibrated to atmospheric presssure. The mixture was then adjusted to pH 5 by addition of 7-oxabicyclo-[2.2.1]-heptane - 2,3 - dicarboxylic acid (Compound I). The mixture was separated by filtration and washed once with a dilute solution of 1,1'-ethylene-2,2'-dipyridinium dibromide, Compound VIII. The product was dried at 70° C. and analyzed for C and N to determine the amount of toxicant adsorbed. 23 mg. of Compound I and 5 mg. of Compound VIII were found to be present in each gram of product. After drying, the void spaces were regenerated so that the product had low density. The product was easily wet with water but floated in the surface. The release rate of each component was about comparable to that noted in Example 1. The material when mixed with floating duckweed, kept in a tank, was more effective as an aquatic herbicide than when the same total amount of the two herbicides was added to the system in their soluble form.

The experiment was repeated using expanded vermiculite in place of perlite, and the results were comparable.

EXAMPLE 8

A particulate mixture of aluminum hydroxide, calcium carbonate and magnesium hydroxide in equal parts containing an equivalent ion of the organic dicarboxylate herbicide Compound I adsorbed thereon by ion-exchange from 5 percent aqueous solution was evaluated as an aquatic herbicide using elodea (*Elodea canadensis*) and coontail (*Ceratophyllum demersum*) growing in 4.5 liter tanks. Each tank was divided by a porous membrane that was impermeable to particles but permeable to water. In this way, particles could be added to one side without danger of contacting the plants growing in the other. Both sets of plants, however, shared the same water which maintained a uniform concentration distribution of desorbed toxicant in both compartments by diffusion and mixing. About 0.25 g. of these particles, containing less than 1 percent toxicant adsorbed on the surface, was distributed in one compartment of each of three replicate samples. The particles settled uniformly on foliage and other surfaces. All of the plants growing in this compartment of the three replicates died within a week, whereas those growing in the same water but in the particle-free compartments continued to flourish.

Forty parts of hydrobiotite (>200 mesh) were slurried into a solution of 10 parts $MgCl_2$ dissolved in 200 parts water. The mixture was neutralized to pH 9 with dilute aqueous NaOH. The solids were removed by filtration and washed with an aqueous solution of disodium endothall, and then with water. Analysis indicated that the product contained about 2.7 percent endothall. The composition was evaluated as above using a 0.25 g. sample. The plants growing in the treated part died within a week, whereas those growing in the control part continued to grow.

The procedure was repeated using 10 parts of zinc chloride instead of the magnesium chloride. The product was found to contain about 3 percent of endothall. The results of treating elodea with this material were the same.

The procedure was repeated in essentially the same manner, but using 10 parts of ferric chloride and neutralizing to pH 7 with 10 percent aqueous sodium hydroxide, followed by treating the precipitaate with aqueous endothall solution. The product contained about 2.5 percent of endothall and was effective to kill elodea as described above.

Similarly, 40 parts of hydrobiotite (>200 mesh) were slurried in a solution of 10 parts sodium aluminate in 400 parts water. A solution of 1 part $CuSO_4$, 5 parts triethanolamine and 100 parts water was then added with stirring, and the resulting mixture was neutralized to pH 8 by addition of dilute aqueous HCl. The product was collected by filtration, washed with disodium endothall and then with water. A 0.25 g. sample of this material was distributed over one-half of the elodea and algae vegetation growing in a 10 liter tank as described previously. The treated algae and elodea died within a week, the untreated vegetation survived.

EXAMPLE 9

Forty grams of hydrobiotite were slurried in a solution of 10 g. of sodium aluminate in 200 cc. of water. The mixture was adjusted to pH 8 by addition of a 5 percent by weight aqueous salt solution containing $CuCl_2$, $MgCl_2$, $FeCl_3$, $ZnCl_2$, and $CaCl_2$ in equiomolar amounts. The product was hydrobiotite (>200 mesh) coated with a mixture of $Al(OH)_{3-n}Cl_n$, $Cu(OH)_{2-n}Cl_n$, $Mg(OH_{2-n}Cl_n$, $FeCl_3$, $ZnCl_2$, and $CaCl_2$ in equimolar amounts. The product was collected by filtration and reslurried in 200 ml. of water. A solution of 10 g. of sodium (7-oxabicyclo-[2.2.1]-heptane-2,3-dicarboxylate) in 100 cc. of water was added, and the mixture was allowed to react at room temperature with continuous agitation for about an hour. The reaction mixture was evaporated to dryness, reground to a powder and extracted four times with 500 cc. portions of distilled water. Analysis of the water indicated that each metallic ion as well as the organic anion was desorbing slowly with each extraction. About one-half gram of this powdered material was distributed over half the plants (coontail) growing in a 4.5 liter tank. The plants in contact with the treated particles died within a week, whereas the other plants growing in the same water but not in contact with the particles continued to fluorish.

EXAMPLE 10

Forty grams of hydrobiotite (>150 mesh) were slurried in a solution of 20 g. of alum ($KAl(SO_4)_2$) in 400 cc. of water. The mixture was neutralized with sodium bicarbonate and the precipitated product was separated by filtration. The insoluble product demonstrated a strong affinity for anions as indicated by the ease with which it adsorbed eosin from solution. One gram samples of this product were reslurried in 5 percent solutions (20 cc.) of each of Compounds I through VII and then recollected and washed in the same way. Each sample was evaluated as an area-specific aquatic herbicide as follows. The sample (0.5 g.) was dispersed selectively over the plants growing in one section of a 4.5 liter tank. The plants growing in the second section were protected during the time required for sedimentation by a partition. In each case the plants growing in the portion treated with particles died within a week, whereas those growing in the other portion of the common aquatic environment continued to flourish.

EXAMPLE 11

Forty grams of finely divided hydrobiotite were dispersed in a solution of 20 g. of sodium aluminate in 500 cc. of water. A solution containing 4 g. of sulfuric acid and 2 g. of copper sulfate in 200 cc. of water was added to the mixture, with stirring. The hydrobiotite coated with $Al(OH)_{3-n}X_n$ and $Cu(OH)_{2-n}X_n (X=SO_4^=)$ was collected by filtration from the alkaline mother liquor. The filter cake was washed with water and and then reslurried in a solution of 110 g. of Compound I, 37 g. of Compound III and 12 g. of Compound VIII in one liter of water. The mixture was allowed to undergo ionic exchange for about 20 minutes, and the product was recollected by filtration, washed three times with 1 liter of water and dried. The material weighed 47 g., and on analysis was found to contain 1 percent Cu, .3 percent N, .3 percent Cl and 2.4 percent C.

Samples of particulate composition, each weighing 0.11 g., were distributed over one-half of the area of 4.5 liter tanks in which elodea, coontail, southern naiad, and algae, respectively, were thriving. Each experiment was conducted in replicate. In each case the aquatic plants with the treated particles on or entrapped in their foliage died within a week whereas the plants growing in the other portion, free of particles, continued to thrive.

EXAMPLE 12

Two hundred parts of finely ground hydrobiotite were dispersed in a solution of 174 parts of aluminum chloride in 3000 parts of water. The mixture was neutralized (pH 7) with 10 percent aqueous sodium hydroxide. The insoluble product was collected by filtration and dried at 100° C. The dry material (305 parts) was reslurried in a solution of 36 parts of the sodium salt of Compound I in 1000 parts of water. The product was collected by filtration, washed three times with one liter of distilled water and dried under reduced pressure at room temperature. Elementary analysis values for carbon were 1.3 percent, indicating that 2 percent of organic anion was present. The coating composition was approximately $Al(OH)_{2.9}$ (Compound I)$_{0.03}$.

The efficacy of this material was tested in a lake site infested with sago pondweed growing to a height of 1 to 2 feet below the surface. The average depth of the lake at the point of test was about 3 feet. Two plot areas, each containing about 6.5 m.$^2$ were staked out 10 meters apart. In one area 28 g. of the sodium salt of Compound I dissolved in 1 liter of water were distributed uniformly into the test area from the surface. This yielded a concentration of 4 p.p.m. of toxicant in the control test area. In the other area 280 g. of the surface-modified powdered hydrobiotite containing 6 g. of Compound I anion adsorbed thereon were distributed over the surface. The dry powder wet instantaneously and the space pattern of the particles expanded continuously in its downward progress. The glistening golden color of the particles demarcated clearly the zone of application. Some of the material traveled outside the zone in the direction of the control site owing to a slight current. The two areas and the background were evaluated weekly, and the observations are noted below:

| No. of weeks | Test site treated with particulate hydrobiotite containing 6 g. adsorbed Compound I | Test site treated with 28 g. of sodium salt of Compound I | Background |
| --- | --- | --- | --- |
| 1 | Weeds darkened, sank to bottom. | Weeds growing to within 1 foot of surface, healthy green color. | Weeds growing to within 1 foot of surface, healthy green color. |
| 2 | No change. | No change. | No change. |
| 4 | Weeds disintegrated. | Weeds growing to the surface. | Weeds growing to the surface. |

Fifty grams of powdered surface-modified hydrobiotite, prepared as described above, were mixed with 1 liter of water in a 2-liter jar, and shaken vigorously for one minute to disperse the particles uniformly. The particulate material wet almost instantly. Using a hand sprayer, the mixture was sprayed on an area of about 6.2 m.² located at the shore of a lake, the surface of which was covered completely with water lilies and the water volume beneath the surface was filled with a thick submersed weed growth. The spray settled on the water lilies and the water surface between the leaves, from which the particles spread uniformly throughout the water space below the surface vegetation in a pattern that replicated the general shape of the surface area treated. A small gradual increase in the target area occurred as the particles progressed downward to the bottom. The particles on the leaves of the water lilies dried to a coherent film that adhered tenaciously. It imparted a gold veneer to each leaf which was not washed away despite heavy intermittent rainfall that raised the level of the lake two inches during the seven days following application.

A series of sequential colored photographs of the target area recorded that the surface leaves, stained with treated hydrobiotite flakes that were now matted in the form of a thin film, began to curl after one day, turned brown after three days, began to sink after four days, and settled to the bottom within seven days. The submersed growth that filled the space below the surface also died within seven days. Only that aquatic plant life to which the treated particles adhered were eradicated, whereas those growing in the immediate vicinity of the treated plants were unaffected despite the fact that they shared essentially the same bulk water composition. The target area was clear and completely free of all vegetation, in sharp contrast to the surrounding area which was still flourishing with aquatic vegetation.

EXAMPLE 13

Eight 50' x 50' plots were marked out in a pond about 5 feet deep near Denver, Colo. Each plot contained dense growths of coontail, parrotfeather and sago pondweed. Duplicate plots were treated with the sodium salt of Compound I in amounts of 2.6 and 5.2 lbs. (equivalent to bulk concentrations of 3 and 6 p.p.m.) as controls, and others were treated in duplicate with an amount of 1.3 and 2.6 lbs. of Compound I adsorbed on a carrier (aluminum hydroxide-coated hydrobiotite) which if completely desorbed instantaneously would have afforded bulk concentrations respectively of 1.5 and 3 p.p.m.

In the case of the control tests, injury was restricted to the upper parts of the plants, and extensive drift of herbicide out of the plots was obvious from plant damage observed well outside of the treated area. The effect of addition of 2.6 lbs. of Compound I (3 p.p.m.) was to cause slight damage to the upper parts of the plants only, while that caused by 5.2 lbs. (6 p.p.m.) was somewhat greater in that the weed bed had dropped a more perceptible amount, but damage was still restricted to the upper part of the plants. In marked contrast to these results, there was almost no drift of herbicide from the plots treated with the experimental formulation. The edges of these plots were surrounded by healthy plants, and then there was an abrupt drop in the vegetation level inside the plot where it had been treated. At the higher concentration, the vegetation had dropped to the bottom of the pond leaving a box-shaped void. The level of plant injury caused by 5.2 lbs. of the soluble form of Compound I to the control plots was about equivalent to that caused in the test plots by 1.3 lbs. added in the form of compositions of the invention and considerably less than that amount caused by 2.6 lbs. added in that form.

In suitable test sites in lakes located in Minnesota, Colorado, Florida and Massachusetts, aquatic weeds growing in the target areas were carefully identified so that the specific sensitivity to the herbicide in question could be rated relative to its normal reaction to herbicide applied in its solvated form. Replicate test areas (about 2000 sq. ft.) were used.

Anions of Compounds I, II and III, or combinations thereof, were adsorbed onto $Al(OH)_{3-n}X_n$ coated hydrobiotite or vermiculite and distributed over some of the test areas by means of conventional mechanical sprayers. Other areas were treated with a liquid or granular form of the toxicants used for comparison. The amounts of each material used, and the combinations, were such that control plots and test plots received treatment on an equivalent basis, i.e. the amount of composition of the invention used was such that if it had been instantly dissolved the concentration of toxicant would have been the same as or a fraction of that of the soluble form of the toxicant in the control plots. Concentrations of controls used in the comparative test areas ranged from 0.5 to 16 p.p.m.; theoretical concentrations of compositions of the invention used for test ranged from 0.25 to 8 p.p.m.

The extent of plant damage to each species in the test and control areas were noted, and the relative effectiveness of a given amount of toxicant applied in its adsorbed form to that applied in solvated form was evaluated. In every case, the effectiveness of the compositions of the invention was greater than that of the comparative, soluble toxicants; in an estimate of relative effectiveness, the new compositions rated from 3 to 8 times better than the toxicants alone.

EXAMPLE 14

Forty parts of bentonite (200 mesh) were slurried in a solution of 10 parts methyl iodide quaternary salt of poly (5-vinyl - 2 - methylpyridine) dissolved in 500 parts water. Adsorption of the polymeric salt caused the bentonite to settle out of suspension. The coated bentonite product was separated by filtration, and then treated with aqueous disodium endothall, followed by washing with water. A sample (about 0.27 g. dry equivalent weight) of this material was distributed over one-half of elodea plants growing in a 10 liter tank as described previously. Only the plants contacted by the coated bentonite died, leaving the other half essentially unaffected.

The difficulties caused when clay is present and the useful material which can be made using clay as a particulate carrier despite its irreversible absorptive characteristics are shown by the following procedures. Fifty parts of finely powdered clay were dispersed in 10 parts of sodium aluminate dissolved in 500 parts of water. The mixture was neutralized to pH 6 by addition of 10 percent aqueous HCl and the solids collected by filtration and reslurried in fresh water. The suspended solid was recollected by filtration into a column 1-inch in diameter and 12 inches high. A solution containing 2.4 g. of 1,1'-ethylene-2,2'-dipyridinium dibromide (Diquat) in one liter of water was passed through the column. This was followed by 3 liters of fresh water and 3 liters of 1 percent aqueous NaCl solution which removed unadsorbed toxicant. The contents of the column were removed and dried; analysis indicated that the material contained about 1 percent Diquat.

An equivalent weight of unmodified clay was used to pack the exchange column described above. A liter of the aqueous solution containing 2.4 g. of Diquat was passed through the column. All of the Diquat was retained, and subsequent washing with several liters of fresh water and then 1 percent NaCl solution failed to elute detectable quantities of adsorbed Diquat. The contents of the column were removed and dried; analysis indicated that the unmodified clay retained about 4 percent Diquat which could not be desorbed.

Samples of each of the above products weighing 0.25 g. were added to test jars filled with 4.5 liters of water, in which were growing healthy stands of elodea. The plants sprinkled with Diquat adsorbed onto aluminum hydroxide-coated clay, died within a week. Plants sprinkled with the Diquat adsorbed onto unmodified clay continued to flourish.

The technique of slurrying a particulate carrier with sodium aluminate and then precipitating aluminum hydroxide upon the surfaces of the particles, as described in Examples 3, 4 and 5 is usefully employed with particulate carriers other than the carrier described in those examples. Thus, finely divided sand can be employed, as well as powdered talc, kaolin, titania, silica (e.g. that obtainable under the trademark "Cab-O-Sil," a low density, fluffy material) synthetic mica (e.g. that described in U.S. Pat. No. 3,001,571), glass or plastic micro-bubbles and the like.

In the case of the coated sand, it is found by tests using dyes that the particles are not coated entirely uniformly, but may have patches of coating on the surface. Nevertheless, these adsorb the toxicant by ion-exchange and are useful for the purposes of the invention.

When synthetic mica of the type described in the said patent is employed (synthetic fluoro-phlogopite mica) a gel is formed which can be mixed with toxicants to bring about ion-exchange in the gel. This is used as such, as it retains its gel-state even when dispersed as droplets into water. The gel clings to the surfaces of weeds or algae and these are killed by the local concentration of toxicant.

When the above-described coated particulate carriers were used to adsorb, by ion-exchange, endothall, antimycin A, pentachlorophenol, picloram, trichloroacetic acid, 2,2-dichloropropionic acid, dalapon, amitrole, 2,4,5-T, silvex and the like, the resulting compositions were highly effective in killing aquatic weeds and other undesirable aquatic organisms.

EXAMPLE 15

Deionized water (400 parts) was charged to a glass reaction vessel. Stirring was initiated and 27.0 parts of 70 percent sodium aluminate and then 70.4 parts of finely ground mica (hydrobiotite) were added. After the slurry became uniform, 78.0 parts of 30 percent sulfuric acid were charged slowly into the vessel. The pH at this point was 4.0. The vessel was heated to 70° C. Next, 144.5 parts of 18.3% aqueous disodium endothall were added to the vessel which was then heated for three hours at 80° C.

The resulting slurry was cooled and spray dried to give a free-flowing, dustless, wettable powder product. Chemical analysis of the product is as follows (expressed in percent by weight):

| | |
|---|---|
| Dihydroxy aluminum salt of endothall (endothall acid equivalent: 13.4) | 22.1 |
| Sodium sulfate | 20.6 |
| Mica | 44.3 |
| Water | 13.0 |
| | 100.0 |

Exclusive of water, this is equivalent to approximately 15 percent of toxicant (endothall), 10 percent of reversible ion-exchanger (aluminum hydroxide) and 75 percent of carrier (including the sodium sulfate as well as the mica).

Endothall-containing compositions of this type with endothall (acid equivalent) contents ranging from near 0, e.g. 0.1 up to 30 percent are conveniently prepared in this way. Such products have been used to control unwanted aquatic plants, the preferred application rate being from about 35 to 350 pounds of the composition per acre of water treated.

EXAMPLE 16

Deionized water (420 parts) was charged to a glass reaction vessel. Stirring was initiated and 9.4 parts of 70 percent sodium aluminate was dissolved in the water, 27.8 parts of 31.5 percent hydrochloric acid were added slowly with stirring and the vessel was heated to 80° C. Next, 92.8 parts of finely ground hydrobiotite mica and 234.0 parts of 20 percent aqueous sodium silvex were added slowly. The contents of the reaction vessel were heated for two hours at about 80–83° C. and 2.1 parts of a 75 percent aqueous sulfonated succinic acid wetting agent were added.

The slurry was cooled and spray dried to yield a free-flowing, dustless, wettable powder product. A typical batch analysis is as follows:

| | |
|---|---|
| Monhydroxy aluminum salt of silver (silvex acid equivalent: 24.3) | 26.2 |
| Sodium chloride | 7.9 |
| Mica | 52.3 |
| Sodium dioctylsulfosuccinate | 0.6 |
| Water | 13.0 |
| | 100.0 |

Exclusive of water, this is equivalent to approximately 28 percent of toxicant (silvex), 2 percent of reversible ion-exchanger (aluminum hydroxide) and 70 percent of carrier.

The preferred application range of this composition in the control of aquatic plants in the same as that of the previous example. The silvex (acid equivalent) content of compositions of this type can vary from near zero, e.g. 0.1 up to 35 percent and above.

In systems such as these (e.g. of aluminum hydroxide and silvex) in which the carrier is composed of excess reversible ion-exchange material, toxicant levels up to 85 percent can be achieved.

EXAMPLE 17

Pellets of the type described in Example 5 made from particles containing Compounds X, XI, XII, XIII, XIV and XV were tested for lake bottom application to control organisms that live or feed in lake bottoms. The pellets softened as soon as they contacted the water, and the downward motion was sufficient to complete disintegration. The resulting particles distributed themselves uniformly across the bottom. The spreading of color along the bottom demonstrated visually the localized toxicant contamination. This was accompanied by increased activity of the mud dwellers in their attempt to escape the contaminated area, followed by death of these organisms.

To test whether or not a sea lamprey toxicant such as m-trifluoromethyl-p-nitrophenol would be more toxic to fish life after desorption from the anion exchange surface, comparative environments were established in which the lowest lethal concentration of this material was dissolved in one tank as a control, and the same amount of toxicant adsorbed on the ion-exchange particles was added to a second tank. Three fresh water minnows were then placed in each tank. The experiment was replicated threefold. In each case all the fish in the control tanks died, but only one fish out of nine died in the tanks containing ion-exchanged insoluble compositions.

EXAMPLE 18

A sample of 48 parts of finely ground $$Al(OH)_{3-n}Cl_n-$$

coated hydrobiotite (>200 mesh), prepared as described in previous examples, was mixed with 20 parts of m-trifluoromethyl-p-nitrophenol in an aqueous suspension. After ion-exchange had taken place the particles were coated with a thin layer of urea-formaldehyde crosslinked to a low degree by exposure to a small amount of formaldehyde for a short time. The coated particles were very hydrophilic. The urea-formaldehyde polymer coating disappeared after several days' exposure to a slow stream of water. The rate of desorption of the phenolate was extremely slow during this period. After removal of the coating, the desorption rate was that expected for the condition of the water and the fraction of phenolate remaining on the particles. These particles are useful for treatment of rapidly moving streams where the particles must travel for miles before coming to rest in quiet pools inhabited, e.g. by sea lamprey larvae. There the particles settle on the mud where the ionic conditions due to decay and oxidation of organic matter release the phenolate rapidly to kill the local population of larvae.

EXAMPLE 19

A 100 g. sample of sand coated with aluminum hydroxide and containing pentachlorophenolate ion in amount of 3 percent of the product was sprinkled over an area of 10 square feet of an oyster bed. Re-examination three months thereafter indicated that the oysters in the thus treated area were free of oyster drill attack, whereas those in control areas treated with an equivalent amount of pentachlorophenol in its solvated form manifested significant damage from this predator.

Another 100 g. sample of aluminum hydroxide coated sand was treated with 0.5 g. of antimycin A dissolved in 30 ml. of acetone, and then dried. The product was sprinkled onto an aquatic mud bed over which was flowing a slow stream of water. The particles sank rapidly to the bottom in a uniform pattern. Baby carp habitating this mud bottom environment were killed, whereas other fish swimming above the bed appeared to be unaffected.

What is claimed is:

1. A particulate composition for specific area application in water environments for control of undesirable aquatic vegetation therein without rendering the bulk of the water environment lethal to higher animals, consisting essentially of at least an effective amount of at least one ionic normally water-soluble aquatic herbicidal toxicant substance bonded by reversible ion-exchange to a particulate carrier system comprising a water-insoluble hydrous oxide of a polyvalent metal ion-exchanger, the composition varying in specific gravity from that of water by a controlled amount so that when it is dispersed in water, it concentrates in local areas in which the undesirable aquatic vegetation is found and there releases the toxicant by desorptive ion-exchange to provide localized lethal concentrations of the toxicant.

2. A particulate composition for specific area application in water environments for control of undesirable aquatic vegetation therein without rendering the bulk of the water environment lethal to higher animals, consisting essentially of at least an effective amount of at least one ionic normally water-soluble aquatic herbicidal toxicant substance bonded by reversible ion-exchange to a particulate carrier system comprising a water-insoluble hydrous oxide of a polyvalent metal ion-exchanger precipitated onto a water-insoluble particulate carrier, the composition varying in specific gravity from that of water by a controlled amount so that when it is dispersed in water it concentrates in local areas in which the undesirable aquatic vegetation is found and there releases the toxicant by ion-exchange to provide localized lethal concentrations of the toxicant.

3. A composition according to claim 2, in which the ion-exchanger is a cation exchanger.

4. A composition according to claim 2, in which the ion-exchanger is an anion-exchanger.

5. A composition according to claim 2 for the control of undesirable submerged growing aquatic plants having specific gravity slightly greater than that of water.

6. A composition according to claim 2 in which the inert carrier is silica.

7. A composition according to claim 2 in which the inert carrier is hydrobiotite.

8. A composition according to claim 2, in which the ion-exchanger is a hydrous oxide of aluminum.

9. A composition according to claim 8, in which endothall is bound to a hydrous oxide of aluminum.

10. A composition according to claim 9, consisting essentially of endothall anions bonded by reversible anion-exchange to the surface of an anion-exchange coating of a hydrous oxide of aluminum supported upon water-insoluble mineral platelets having strong, essentially irreversible cation-exchange surfaces.

11. A composition according to claim 9, consisting essentially of endothall anions bonded by reversible anion-exchange to the surface of an anion-exchange coating of a hydrous oxide of aluminum supported upon silica particles.

12. A method for the control of undesirable aquatic vegetation comprising applying to a specific area of a water environment a particulate composition containing an ionic normally water soluble aquatic herbicidal toxicant substance bonded by reversible ion-exchange to a particulate carrier system comprising a water-insoluble hydrous oxide of a polyvalent metal ion-exchanger precipitated onto a water-insoluble, particulate, inert carrier, said particles varying in specific gravity from that of water by a controlled amount so that they concentrate in local areas in which the undesirable vegetation is found and there release the toxicant by desorptive ion-exchange, the amount of the particulate composition applied being sufficient to provide localized lethal concentrations of the toxicant without rendering the bulk of the water environment lethal to higher animals.

13. A method according to claim 12 in which the ion-exchanger is a hydrous oxide of aluminum.

14. A method according to claim 13 in which the toxicant is an endothall anion, and the support platelets are hydrobiotite.

15. A pelletized herbicidal composition wherein the pellets contain particles according to claim 1.

References Cited

UNITED STATES PATENTS

| | | | |
|---|---|---|---|
| 3,316,173 | 4/1967 | Mills et al. | 210—64 |
| 3,421,880 | 1/1969 | Mussell et al. | 71—66 |
| 3,325,272 | 6/1967 | Hamaker et al. | 71—94 |
| 3,083,089 | 3/1963 | Renner | 71—111 |
| 3,376,127 | 4/1968 | McConnell et al. | 71—66 |
| 3,002,932 | 10/1961 | Duwell et al. | 252—179 |
| 3,056,723 | 10/1962 | Galloway | 71—Dig. 1 |

FOREIGN PATENTS

| | | | |
|---|---|---|---|
| 982,964 | 2/1965 | Great Britain | 71—9 |
| 630,023 | 10/1949 | Great Britain | 71—117 |

OTHER REFERENCES

Brydon et al., "The Nature of Al(OH)$_3$-Montmorillonite Complexes" (1966), CA 65, p. 16691 (1966).

The American Minerologist, vol. 26, pp. 478–84 (1941).

LEWIS GOTTS, Primary Examiner

G. HOLLRAH, Assistant Examiner

U.S. Cl. X.R.

71—65, 66, 79, 88, 92, 94, 97, 105, 110, 113, 116, 117, Dig. 1; 424—244, 324, 347, 348